US011295496B2

(12) United States Patent
Jeyakar et al.

(10) Patent No.: US 11,295,496 B2
(45) Date of Patent: Apr. 5, 2022

(54) INTELLIGENT EXPORTING OF IMAGES USING AN IMAGE EDITING APPLICATION

(71) Applicant: Adobe Inc., San Jose, CA (US)

(72) Inventors: Jaideep Jeyakar, Bangalore (IN); Ankur Murarka, Karnataka (IN)

(73) Assignee: Adobe Inc., San Jose, CA (US)

(*) Notice: Subject to any disclaimer, the term of this patent is extended or adjusted under 35 U.S.C. 154(b) by 0 days.

(21) Appl. No.: 16/678,020

(22) Filed: Nov. 8, 2019

(65) Prior Publication Data

US 2021/0142540 A1 May 13, 2021

(51) Int. Cl.
*G06T 11/60* (2006.01)
*G06N 20/00* (2019.01)

(52) U.S. Cl.
CPC .............. *G06T 11/60* (2013.01); *G06N 20/00* (2019.01)

(58) Field of Classification Search
CPC .. G06N 3/08; G06N 20/00; G06T 7/11; G06T 2207/30168; G06T 2207/20212; G06T 2207/20216
See application file for complete search history.

(56) References Cited

U.S. PATENT DOCUMENTS

2016/0014418 A1* 1/2016 Shao .................... H04N 19/115
375/240.02
2020/0081683 A1* 3/2020 Cremer ................... G10L 19/00

OTHER PUBLICATIONS

NPL: Adam Dimech, Script to list files by type and size, export to Excel, Jul. 1, 2014, https://code.adonline.id.au/script-to-list-files-by-type-and-size-export-to-excel/ (Year: 2014).*
Adam Dimech, Script to list files by type and size, export to Excel, Jul. 1, 2014, https://code.adonline.id.au/script-to-list-files-by-type-and-size-export-to-excel/ (Year: 2014).*
Kevin, How Can I find files that are bigger/smaller than x bytes? , Feb. 28, 2013, https://superuser.com/questions/204564/how-can-i-find-files-that-are-bigger-smaller-than-x-bytes (Year: 2013).*

(Continued)

*Primary Examiner* — Ming Wu
(74) *Attorney, Agent, or Firm* — Kilpatrick Townsend & Stockton LLP

(57) ABSTRACT

A technique for providing intelligent exporting of images is provided. The technique includes receiving information identifying a set of images to be exported and receiving a set of parameter values to be used for exporting the set of images. The technique includes receiving a target total export size value for exporting the set of images. The target total export size indicates a memory size for storing a set of exported images corresponding to the set of images. The technique includes determining an image quality level to be used for exporting the set of images based upon the target total export size value and the set of parameter vales. The technique includes generating a set of exported images corresponding to the set of images. In one example, the set of exported images are generated using the image quality level and the set of one or more parameter values such that a total memory size for storing the set of exported images is within a threshold value of the target total export size.

20 Claims, 11 Drawing Sheets

(56) References Cited

OTHER PUBLICATIONS

Saikat Basu, 5 Ways to Find Duplicate Image Files on Windows PC, Jan. 16, 2009, https://www.makeuseof.com/tag/5-ways-to-find-duplicate-image-files-on-your-computer-windows/ (Year: 2009).*

Adobe Inc., Adobe Photoshop Lightroom Classic CC Help Manual, Chapter 1 "Introduction to Lightroom Classic CC", p. 1 and Chapter 12 "Export Photos", pp. 218-226, Apr. 2018, updated May 10, 2018.

Harrington, Richard, Luminary 2018 for Windows User Guide Version 1.3, "Welcome and Key Features and Benefits of Luminar", pp. 1-3, "Saving & Exporting Files", "Batch Processing Photos", "Batch Processing Settings", "Running the Batch" pp. 135-142 and "Keeping Luminar Up to Date" p. 146, 2018.

Apple Inc., Photos User Guide, "Export Photos, Videos, and Slideshows from Photos on Mac", https://support.apple.com/guide/photos/export-photos-videos-and-slideshows-pht6e157c5f/mac, pp. 1-4, Jan. 15, 2020.

Phase One, "Capture One 12 User Guide", https://support.captureone.com/hc/en-US/categories/360000279017-User-Guide, 27 pages, Nov. 2018.

Phase One, Capture One 11 User Guide "Exporting Originals and Variants", https://help.phaseone.com/en/CO11/Exporting-Photos/Export?p=1, pp. 1-2, Jan. 15, 2020.

* cited by examiner

INTELLIGENT EXPORTING OF IMAGES USING AN IMAGE EDITING APPLICATION

TECHNICAL FIELD

This disclosure relates generally to processing of images. More specifically, but not by way of limitation, this disclosure relates to techniques for intelligently exporting images.

BACKGROUND

Digital image editing applications allow users to manage and manipulate digital images. One of the basic features that almost all image editing and image organizing applications provide is the ability to 'export' images. A user typically selects one or more images to be exported. The user may then specify an image format for the exported images, where the image format is typically different from the format of the source images. The user may also specify a memory location where the exported images are to be stored. As part of the export operation, for each user-selected image, an export version of the image is generated in the user-specified image format and the export version is then stored in the destination memory location specified by the user. The stored exported version of the image is referred to as the exported image. A user may want to export images for various reasons, such as to share them with others, change the format of the image, save copies of the images in a particular format, generate images in a format suitable for printing, generate export images for edited images in a format that allows them to be published or delivered to users, enable other applications to be able to read and process the images, and so on.

SUMMARY

This disclosure relates generally relates to processing of images. More specifically, but not by way of limitation, this disclosure relates to techniques for intelligently exporting images.

In an example, an image export system is disclosed that provides enhanced export functionality for intelligently exporting images. The image export system receives information identifying a set of images to be exported and receives a set of parameter values to be used for exporting the set of images. The image export system receives a target total export size value for exporting the set of images. The target total export size indicates a memory size for storing a set of exported images corresponding to the set of images. The image export system determines an image quality level to be used for exporting the set of images based upon the target total export size value and the set of parameter vales. The image export system generates a set of exported images corresponding to the set of images. In one example, the set of exported images are generated using the image quality level and the set of one or more parameter values such that a total memory size for storing the set of exported images is within a threshold value of the target total export size.

Various embodiments are described herein, including methods, systems, non-transitory computer-readable storage media storing programs, code, or instructions executable by one or more processors, and the like. These illustrative embodiments are mentioned not to limit or define the disclosure, but to provide examples to aid understanding thereof. Additional embodiments are discussed in the Detailed Description, and further description is provided there.

BRIEF DESCRIPTION OF THE DRAWINGS

Features, embodiments, and advantages of the present disclosure are better understood when the following Detailed Description is read with reference to the accompanying drawings.

DETAILED DESCRIPTION

Figure 1:
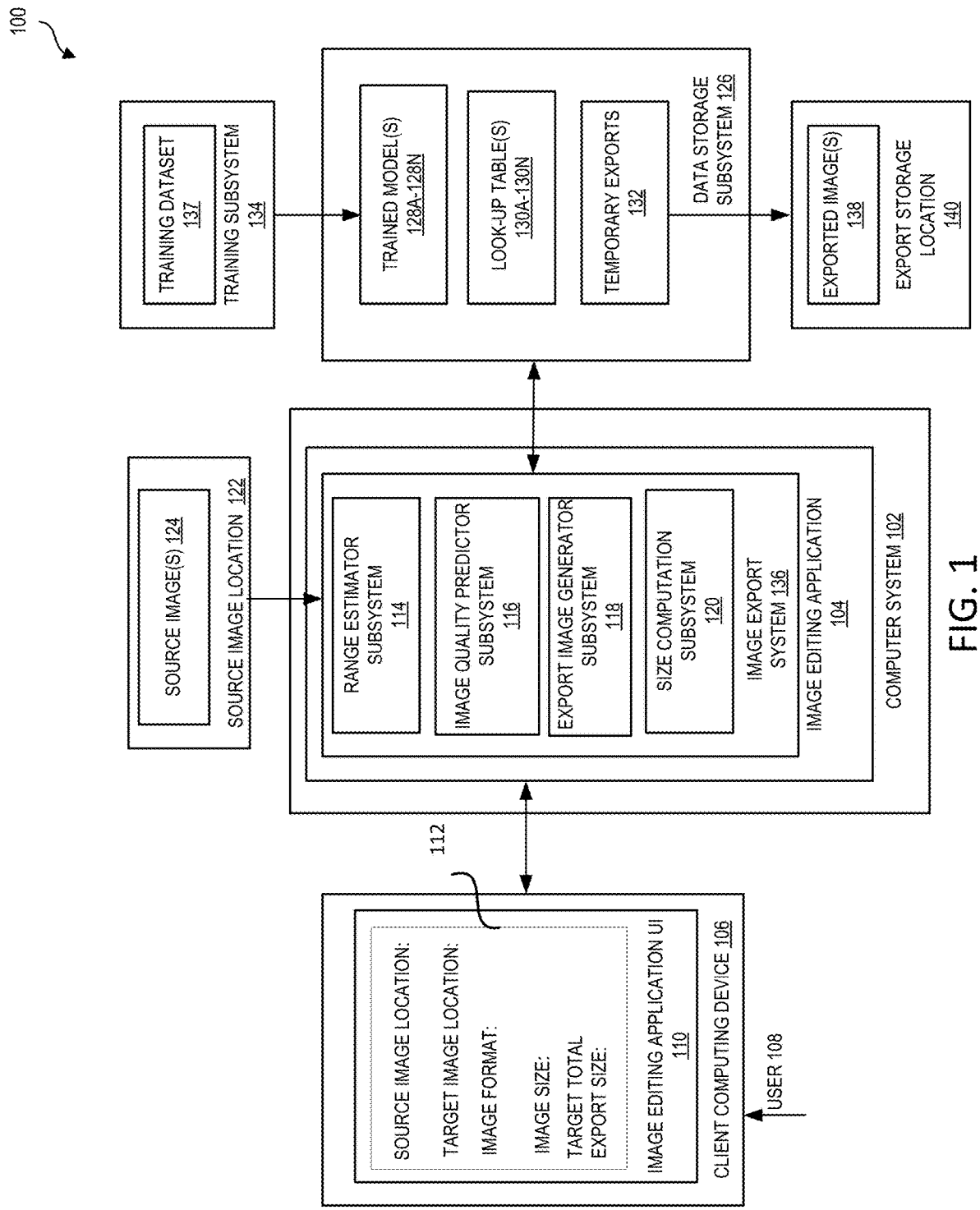
FIG. 1 depicts an example of a computing environment including a computer system providing enhanced export functionality, according to certain embodiments.

The disclosure relates generally to processing of images. In particular, techniques are described for intelligently exporting images. In one embodiment, an image export system is disclosed that provides an intelligent and improved export functionality for exporting a set of images. The image export system allows a user to select a set of images to be exported and specify input parameters to be used for the export operation such as (1) the file type or format for the exported images, (2) a destination memory location for storing the exported images, and (3) a size (e.g., small, medium, large) for the exported images. The image export system allows the user to select or specify a value for a new "target total export size" parameter for the export operation. Based upon the user-selected value for the target total export size parameter, the image export system automatically predicts an optimal image quality level for exporting the user-selected set of images. The image export system then exports the images using the predicted image quality while ensuring that the total memory size required to store the exported images is close to the target total export size value specified by the user.

As indicated in the Background section, the ability to 'export' images is commonly offered by image editing and image organizing applications. The user can specify the image format for the exported images and a memory location where the exported images are to be stored. Some existing export tools also allow a user to specify a particular image quality level (e.g., an image quality setting) for the export operation. It is often challenging for users to know what specific image quality level to select. Typical users only know that higher image quality levels translate to bigger file sizes for the exported images. In many situations, users just select a particular image quality setting that they have used in the past or randomly select an image quality setting for the export operation. If they choose a high image quality setting, the sizes of exported images are larger. Alternatively, if they choose a very low image quality, the sizes of the exported images are smaller relative to the exported images for a higher image quality setting. The user has little control on the overall memory needed for storing the exported images.

Some export tools allow users to specify a "file size limit" for each exported image. The export tool then ensures that each exported image file size does not exceed the specified file size limit. However, this option is not ideal when the images being exported are of different file sizes. In such a case, a large sized image (e.g., a 10 MB source image) and a smaller sized image (e.g., a 2 MB source image) are both compressed to the same user-specified file size limit (e.g., 1 MB), resulting in unequal degradation of image quality, for example, the image quality of the export image corresponding to the large sized source image is heavily degraded. This process is highly inefficient, especially when multiple (e.g., tens or hundreds or thousands) of source images are to be exported.

The present disclosure addresses several deficiencies of conventional export systems that provide export functionality for exporting a set of images. For example, as described in the Background section, conventional export systems typically expect a user to either specify a "file size limit" for each exported image or select a particular image quality to be used for an export operation. The export tool has to ensure that each exported image file size does not exceed the specified file size limit. However, this option is not ideal when the images being exported are of different file sizes. In such a case, a large sized image and a smaller sized image are both compressed to the same user-specified file size limit resulting in the image quality of the exported image corresponding to a large sized source image to become heavily degraded. Additionally, when different image quality settings are specified by users, conventional export systems perform the export operation by creating multiple image quality renditions of the image with the different image quality values until it finds a rendition that matches the target size. This is an inefficient way of getting the right image quality, especially when processing hundreds or thousands of images.

The present disclosure describes techniques for providing an intelligent and improved export functionality for exporting a set of images by automatically determining an optimized image quality to be used for the export operation so that the total memory size needed for the export operation is within the constraints of the destination location for storing the exported images. The user therefore does not have to specify or worry about the image quality to be used for exporting the set of images. By allowing the user to select or specify a value for a new "target total export size" parameter for the export operation, the present disclosure provides the user with the ability to have control over the total memory size used for storing the exported images.

By specifying a value for this new target total export size parameter, the user indicates to the image export system that, for the set of images to be exported per the user-provided input parameters, the total memory needed to store the exported images should be "close" to the value specified by the user for the target total export size parameter. The value specified by the user may, for example, be based upon the storage size constraints or limitations of the destination storage location where the exported images are to be stored. In certain instances, "close" is interpreted as being within a certain threshold (e.g., a certain percentage (e.g., within plus or minus 10%) of the value specified by the user for the target total export size parameter). In other instances, "close" is interpreted as being within a certain threshold (e.g., a certain percentage (e.g., 10%) of the value specified by the user but not to exceed the value specified by the user for the target total export size parameter). Based upon the user-selected value for the target total export size parameter, the image export system then automatically predicts an optimal image quality level for exporting the user-selected set of images. The optimal image quality level represents a maximized image quality level for exporting the set of images while ensuring that the total output size of the set of exported images is within a threshold value of the target total export size value specified by the user. In certain examples, the optimal image quality level is determined using trained models that map different image quality levels to corresponding image compression factors. The image export system then exports the images using the predicted image quality while ensuring that the total memory size required to store the exported images is close to the target total export size value specified by the user.

The following non-limiting example is provided to introduce certain features. In this example, an image export system is provided that is capable of receiving a request from a user to export a set of one or more images. The image export system may be part of an image editing application that provides enhanced export functionality for exporting the set of images. The image export system receives, via a Graphical User Interface (GUI), information from the user identifying a set of values for parameters to be used for the export operation. The information received may include, for example, (1) information identifying the image or file format for the exported images, (2) information identifying a destination memory location where the exported images are to be stored, and (3) an image size to be used for the exported images. In certain examples, the image export system receives a value provided by the user for a target total export size parameter for exporting the set of images. The value identifies a threshold for the total memory for storing the set of exported images corresponding to the set of images. In certain examples, the GUI provides the user with a user-selectable and movable slider to select a value for the target total export size parameter. The user can adjust the slider to select a particular value for the target total export size that is within a range from a minimum total export size to a maximum total export size, both end points inclusive.

After selecting the total export size via the GUI, the user selects an "Export" button to execute the export operation. The image export system receives the parameters specified by the user and the target total export size value selected/input by the user and predicts an optimal image quality level for exporting the set of images based on the target total export size value. The optimal image quality level represents a maximized image quality level for exporting the set of images while ensuring that the total output size of the set of exported images is within a threshold value of the target total export size value specified by the user. The image export system then exports the set of images according to the parameters specified by the user using the optimal image quality level.

Referring now to the drawings, FIG. 1 depicts an example computing environment 100 including a computer system 102 providing enhanced export functionality according to certain embodiments. In the embodiment depicted in FIG. 1, computing system 102 executes an image editing application 104 that provides enhanced export functionality as described herein. As depicted in FIG. 1, image editing application 104 includes an image export system 136. The image export system 136 also includes a number of subsystems including a range estimator subsystem 114, an image quality predictor subsystem 116, an export image generator subsystem 118 and a size computation subsystem 120. The systems and subsystems depicted in FIG. 1 may be implemented using software (e.g., code, instructions, program) executed by one or more processing units (e.g., processors, cores), hardware, or combinations thereof. The software may be stored on a non-transitory storage medium (e.g., on a memory device).

The computing environment 100 depicted in FIG. 1 is merely an example and is not intended to unduly limit the scope of claimed embodiments. One of ordinary skill in the art would recognize many possible variations, alternatives, and modifications. For example, in some implementations, the image editing application 104 can be implemented using more or fewer subsystems than those shown in FIG. 1, may combine two or more subsystems, or may have a different configuration or arrangement of subsystems. As used herein, an "image editing application" may refer to a graphic application specifically directed to image editing, or to any application that includes an image editing component and an image exporting component. In one example, the image editing application 104 may include or be a part of an image editing application such as Adobe Lightroom® or any other image editing applications.

The image editing application 104 is configured to provide an intelligent and improved export functionality for exporting a set of images. Processing related to the intelligent export operations may be performed by the image export system 136. In certain embodiments, the image editing application 104 allows the user to select a set of images to be exported and specify input parameters to be used for the export operation such as (1) the file type or format for the exported images, (2) a destination memory location for storing the exported images, and (3) a size (e.g., small, medium, large) for the exported images. Additionally, as described herein, the image editing application 104 allows the user to select or specify a value for a new "target total export size" parameter for the export operation. By specifying a value for this new parameter, the user indicates to the image editing application 104 that, for the set of images to be exported per the user-provided input parameters, the total memory needed to store the exported images should be "close" to the value specified by the user for the target total export size parameter. The value specified by the user may, for example, be based upon the storage size constraints or limitations of the destination storage location where the exported images are to be stored. In certain instances, "close" is interpreted as being within a certain threshold (e.g., a certain percentage (e.g., within plus or minus 10%) of the value specified by the user for the target total export size parameter). In other instances, "close" is interpreted as being within a certain threshold (e.g., a certain percentage (e.g., 10%) of the value specified by the user but not to exceed the value specified by the user for the target total export size parameter). Based upon the user-selected value for the target total export size parameter, the image editing application 104 then automatically predicts an optimal image quality level for exporting the user-selected set of images. The image editing application 104 then exports the images using the predicted image quality while ensuring that the total memory size required to store the exported images is close to the target total export size value specified by the user.

In this manner, by providing the target total export size parameter, the image editing application 104 enables the user to have control over the total memory size used for storing the exported images. Additionally, the user does not have to specify or worry about the image quality to be used for exporting the set of images. The image editing application 104 automatically determines an optimized image quality to be used for the export operation while considering the user specified value for the target total export size parameter. As used herein, "image quality" refers to a characteristic of an image that measures the clarity of the image. Various factors affect image quality including but not limited to brightness and evenness of illumination, contrast, resolution, geometry, color fidelity and/or color discrimination of an observed image.

As depicted in FIG. 1, the image editing application 104 is executed by the computer system 102. A user interface 110 of the image editing application 104 may be displayed on a client computing device 106 that is communicatively coupled to the computer system 102, possibly via one or more communication networks. A user 108 of the client computing device 106 may interact with the image editing application 104 using UI 110. The client computing device 106 may be of various types, including but not limited to, a mobile phone, a tablet, a desktop computer, and the like. In certain examples, the user 108 may, via UI 110, interact with the image editing application 104 to import and/or export images, view the loaded images, edit one or more images, or otherwise manipulate an image or a set of images. Editing of an image may include, for instance, color adjustments, image cropping, image re-sizing, rotating images, changing contrast and brightness, output sharpening of images and the like. In one example, the images edited by the user may include photographs. In certain embodiments, the user 108, using UI 110, may utilize the intelligent export functionality provided by the image editing application 104 to export a set of images. Details related to the processing performed by the various systems and subsystems in FIG. 1 for performing the export operation are described below with respect to the flowchart depicted in FIG. 2 and the accompanying description.

Figure 2:
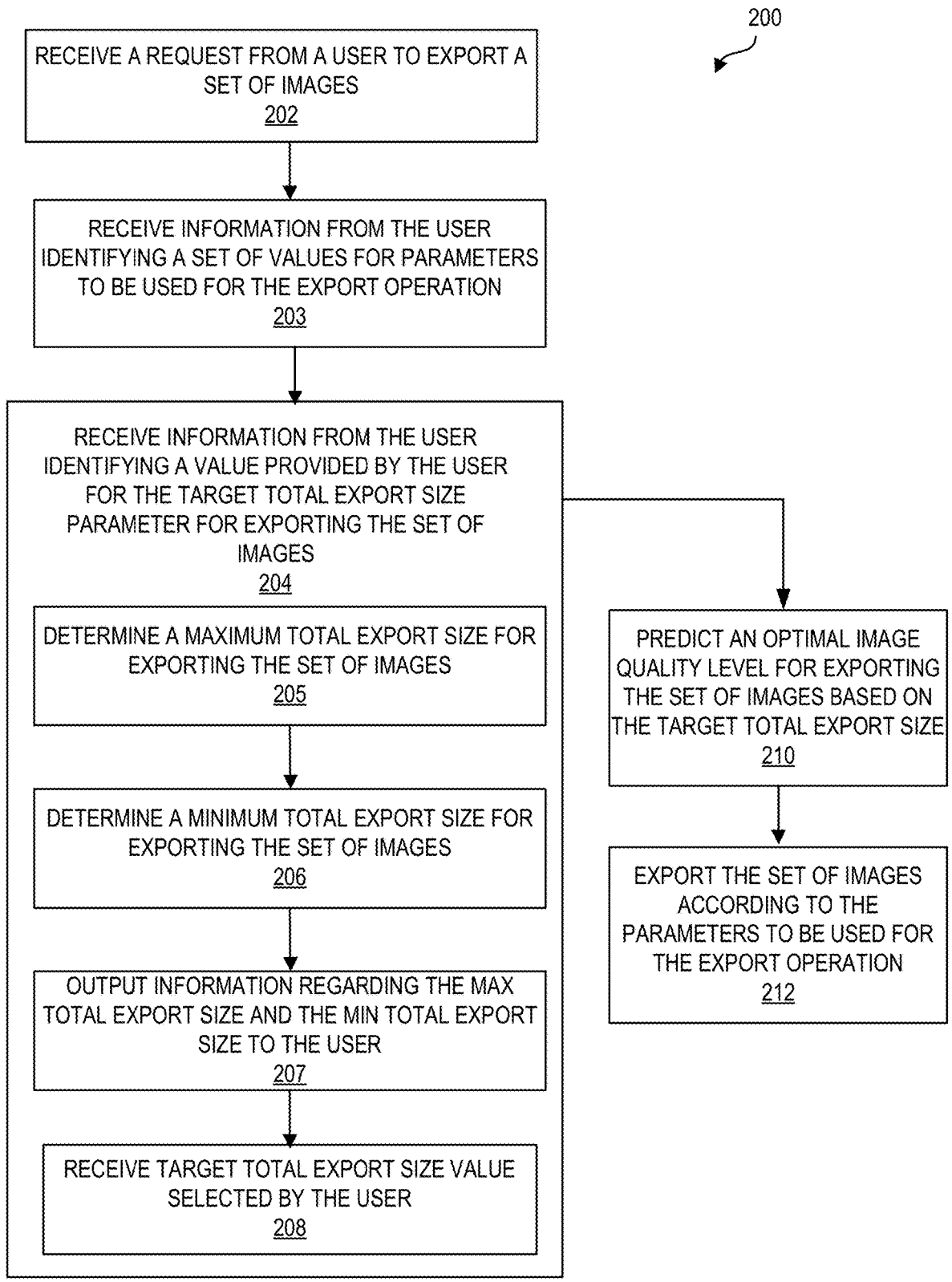
FIG. 2 depicts an example of a process for exporting a set of images, according to certain embodiments.

FIG. 2 depicts an example of a process 200 for exporting a set of images, according to certain embodiments. The processing depicted in FIG. 2 may be implemented in software (e.g., code, instructions, program) executed by one or more processing units (e.g., processors, cores) of the respective systems, hardware, or combinations thereof. The software may be stored on a non-transitory storage medium (e.g., on a memory device). The process 200 presented in FIG. 2 and described below is intended to be illustrative and non-limiting. Although FIG. 2 depicts the various processing steps occurring in a particular sequence or order, this is not intended to be limiting. In certain alternative embodiments, the steps may be performed in some different order or some steps may also be performed in parallel. In certain embodiments, such as in the embodiment depicted in FIG. 1, the processing depicted in FIG. 2 may be performed by the image editing application 104, or more specifically by the image export system 136. In certain embodiments, within image export system 136, the processing in 202-212 in FIG. 2 may be performed by the range estimator subsystem 114, the image quality predictor subsystem 116, the export image generator subsystem 118, and the size computation subsystem 120 depicted in FIG. 1.

At 202, processing is initiated when a request is received from a user to export a set of one or more images. For example, in the embodiment depicted in FIG. 1, the user 108 may use UI 110 to select a set of images to be exported and then send a request to image editing application 104 to request the selected images to be exported. In some instances, such as the embodiment depicted in FIG. 1, the user may select the set of images to be exported from the images loaded by image editing application 104. For example, the user may have imported or loaded multiple images in image editing application 104 for purposes of editing or organizing the images. The user may then select the images to be exported from among these loaded images. In certain embodiments, the user may select a set of images and then select an "Export" option (e.g., a menu item, button) to initiate the processing depicted in FIG. 2.

In other instances, the images need not be loaded in order for the images to be exported to be selected. For example, the user may identify a set of files corresponding to the images to be exported and their storage location. For example, in FIG. 1, the images to be exported (also referred to as source images 124) are stored in source image location 122. The user 108 may, via the UI 110, provide information to the image editing application 104 identifying the source image location 122 and also identifying a set of source images 124 to be exported. For example, a user may use a file or document explorer application to select the images to be exported. The image editing application 104 can then retrieve the set of images from the source image location 122 for performing the export operation. The source image location 122 may be on a camera memory, a memory device or card, a cloud storage location, a flash drive, and the like.

At 203, information is received from the user identifying a set of values for parameters to be used for the export operation. The information received in 203 may include, for example, (1) information identifying the image or file format for the exported images, (2) information identifying a destination memory location where the exported images are to be stored, and (3) an image size to be used for the exported images. There are various different types of formats that the user can specify for the exported images, such as, without restriction, various Joint Photographic Experts Group (JPEG or JPG) formats, Portable Network Graphics (PNG) format, Graphics Interchange Format (GIF) format, Tagged Image File (TIFF) format, Original format, and the like. The image size information identifies the dimensions (size) to be used for the exported images. Common options include "small," "medium," and "large." In certain examples, the user may specify a custom value of the image size. Each of these options translates to a particular image size. For example, the "small" image size option may translate to an image size that has 2046 pixels along the image's long edge.

In certain embodiments, upon receiving the initial request in 202 to export a set of images, image editing application 104 may cause an export dialog window 112 to be displayed to the user for the user to input the information received in 203. For example, in response to the user selecting the "Export" option in 202, dialog window 112 may be displayed to the user for entering the image format, destination location, and image size information. The user may then provide values for the export image format, destination location and image file size parameters via the dialog window 112. In certain examples, additional parameters may be specified in the export dialog window. These parameters may include, without limitation, color, space, an output sharpening medium, embedded thumbnails, specialized image formats for high quality images (e.g., the Tag Image Bitmap File (TIFF) format for enabling bit-depth and transparency) and the like.

At 204, information is received from the user identifying a value provided by the user for the target total export size parameter for exporting the set of images selected in 202. The value received in 204 identifies a threshold for the total memory for storing the set of exported images corresponding to the set of images identified in 202 and where the export operation is performed using the parameter values received in 203.

By specifying a value for the target total export size parameter, the user indicates to the image editing application 104 that, for the set of images to be exported per the user-provided input parameters, the total memory needed to store the exported images should be within a certain threshold of the target total export size parameter value received in 204. In certain instances, the certain threshold is within ±X %, where X is a number such as 1, 2, 3, 4, 5, 6, 7, 8, 9, 10, 15, etc. For example, the threshold may be ±10% of the value for the target total export size received in 204. In such an embodiment, the image editing application 104 performs the export operation (in 212) for the selected images, and using the parameters received in 203, such that the total amount of memory needed to store the exported images is within ±10% of that value. In other instances, the value received in 204 is interpreted to be the maximum memory size required for storing the exported images. In such an embodiment, the image editing application 104 performs the export operation (in 212) for the selected images such that the total amount of memory needed to store the exported images is as close to but does not exceed the target total export size value received in 204.

Different techniques may be used that enable the user to select or specify the value for the target total export size parameter in 204. According to certain embodiments as depicted in FIG. 2, this is achieved by performing the processing depicted in 205, 206, 207, and 208.

At 205, a maximum total export size is determined for exporting the set of images selected in 202 and per the parameters received in 203, where the maximum total export size is the memory size needed to store the exported images assuming the images are exported at a maximum or best (e.g., at 100%) image quality. The maximum total export size thus marks the upper limit for the amount of memory needed for storing the exported images for the images selected in 202 and based upon the parameters provided in 203.

At 206, a minimum total export size is determined for exporting the set of images selected in 202 and per the parameters received in 203, where the minimum total export size is the memory size needed to store the exported images assuming the images are exported at a minimum or lowest (e.g., at 0%) image quality. The minimum total export size thus marks the lower limit for the amount of memory needed for storing the exported images for the images selected in 202 and based upon the parameters provided in 203. For the embodiment depicted in FIG. 1, the processing in 205 and 206 may be performed by the range estimator subsystem 114.

Different techniques may be used by the range estimator subsystem 114 for determining the maximum total export size value in 205 and the minimum total export size value in 206. In certain embodiments, as part of the processing in 205, for each image in the set of images selected in 202, the range estimator subsystem 114 determines the memory size of its corresponding exported image corresponding to the export parameter values received in 203. For instance, the range estimator subsystem 114 may export each image in the set of images at the maximum possible image quality level, i.e., at 100% image quality, to obtain the size of the corresponding exported image. In certain examples, for each selected image, the range estimator subsystem 114 may store the value computed for the exported file sizes for the corresponding exported images at 100% image quality as part of the metadata of the selected image. The range estimator subsystem 114 may then aggregate the sizes of the exported images at 100% image quality to determine the maximum total export size for exporting the set of images selected in 202 at 100% image quality level. Equation (1) shown below is an example of how the range estimator subsystem 114 computes the maximum total export size for the export operation, i.e., the upper memory size limit for storing the exported images that have been exported at 100% image quality:

$$\text{max\_total\_export\_size} = \Sigma_i \text{ exported\_filesize\_at100\% Quality} \quad \text{Eq 1:}$$

where "i" represents the images selected for export.

Since computing the file sizes in 205 for the export images at 100% image quality can take some time, in certain embodiments, these values may be precomputed before the processing depicted in FIG. 2 is initiated. For example, in some instances, the image editing application 104 may be configured to precompute these values for an image when the image is imported or loaded by the image editing application 104. At the time of the import, the image editing application 104 may be configured to export the image at 100% image quality and obtain the file size of the exported image. The image editing application 104 may then store this computed value as part of the metadata associated with the image. As part of the processing in 205, for a selected image to be exported, instead of actually performing the export and determining the file size at 100% image quality in 205, the range estimator subsystem 114 may instead determine the export file size at 100% image quality from the information stored in the metadata for the image. The range estimation subsystem 114 may then aggregate these values for the selected images to determine the maximum total export size in 205. For the embodiment depicted in FIG. 1, the computation of the exported image file size at 100% image quality may be performed by size computation subsystem 120 of image editing application 104.

The edits made to an image can affect the size of that image and also the corresponding exported image size. For instance, the size of an image may reduce if an image is cropped, while an effect such as sharpening can increase the size of the image. Accordingly, when an image is edited, the file size of the corresponding exported image at 100% image quality can change. Accordingly, for an image for which the export file size at 100% image quality has been precomputed, when the image is edited, the export file size at 100% image quality may have to be recomputed. In certain embodiments, the size computation subsystem 120 may re-compute the export image file size at 100% image quality after edits have been applied to the image. As part of the re-computation, the size computation subsystem 120 may export the image (with the edits) at the 100% image quality level and determine a new resulting file size for the exported image. The metadata associated with the image may then be updated to reflect this updated file size value.

The range estimation subsystem 114 may also use different techniques in 206 to determine the minimum total export size in 206, where the minimum total export size is the memory size needed to store the exported images assuming the images are exported at 0% image quality and using the parameters specified in 203. In certain examples, the range estimator subsystem 114 uses one or more trained models 128A-128N to determine the minimum total export size in 206. Multiple training models 128A-128N may be stored in data storage location 126 that is accessible to the image editing application 104. Details related to how these models are trained is provided below. In one embodiment, as part of the processing in 206, the range estimator subsystem 114 may select a particular trained model from the set of trained models 128A-128N based on the export parameter values received in 203. For example, a particular trained model may be selected based upon the image format to be used for the exported images and the size (e.g., image dimension) for the exported images. For instance, if the parameter values received in 203 indicate that "JPEG" format is the format and a "small" size/dimension is selected for the exported images, the range estimator subsystem 114 may choose a particular trained model 128A corresponding to those two parameters. The range estimator subsystem 114 may then use the particular selected trained model to determine the minimum total export size representative of the memory size needed for storing the exported images exported at 0% image quality for the set of selected images.

In certain embodiments, the selected trained model maps image quality levels to corresponding image compression factors (also referred to herein as compression factors). For example, when a desired image quality level is provided as input to the trained model, the model outputs a corresponding compression factor. The compression factor (or image compression factor) that is output by the model indicates a value (may be represented as a percentage) to which the source image (i.e., the image to be exported) is to be compressed in order to generate the corresponding exported image. A compression factor for an image at a particular image quality level "q" can be represented as shown below as Equation 5 and reproduced here:

$$\text{compression factor}(q) = (\text{File size of image at } q\% \text{ quality})/(\text{File size of image at 100\% quality}) * 100 \quad \text{Equation (5):}$$

An example of a pre-trained model is shown below as Equation 6 and reproduced here:

$$cf(q) = 6.01 - 0.249q + 2.48*10^{-2}q^2 - 5.19*10^{-4}q^3 + 3.892*10^{-6}q^4 \quad \text{Equation (6):}$$

where, "q" is the desired image quality level and cf(q) is the compression factor output by the model for a particular image quality level "q."

Details related to how the model represented by Equation 6 is determined are provided below.

In certain embodiments, the range estimation subsystem 114 uses the maximum total export size computed in 205 and the particular trained model that has been selected based upon the format and size parameters to determine the minimum total export size in 206. For example, the minimum total export size is calculated using the following equation (2):

$$\text{total\_size\_at\_0\_quality} = cf(0) * \text{max\_total\_export\_size} \quad \text{Eq 2:}$$

Where, cf(0) is the compression factor computed from evaluation of the selected trained model using an image quality level of 0%; and max_total_export_size—is the memory size for storing the exported images at 100% image quality, as described above. Assuming that the trained model represented by Equation 6 is selected, then setting "q" as 0% in Equation 6, the value for cf(0) is 6.01% (since all the terms in the equation that are multiplied by "q" become zero). Accordingly, the minimum total export size for storing the exported images at 0% image quality level is equal to (6.01/100*max_total_export_size).

Referring back to FIG. 2, at 207, information regarding the maximum total export size determined in 205 (e.g., computer per Equation 1) and the minimum total export size determined in 206 (e.g., computed per Equation 2 and the selected trained model) are output to the user. The maximum total export size represents the upper limit for the memory size needed for storing the exported images exported at 100% image quality level and per the export parameter values received in 203. The minimum total export size represents the lower limit for the memory size needed for storing the exported images exported at 0% image quality level and per the export parameter values received in 203. The maximum and the minimum total export sizes thus represent a range of memory sizes for exporting the set of images selected in 202 and exporting them according to the parameter values received in 203. Accordingly, in 207, the memory size range information may be output to the user.

Figure 4:
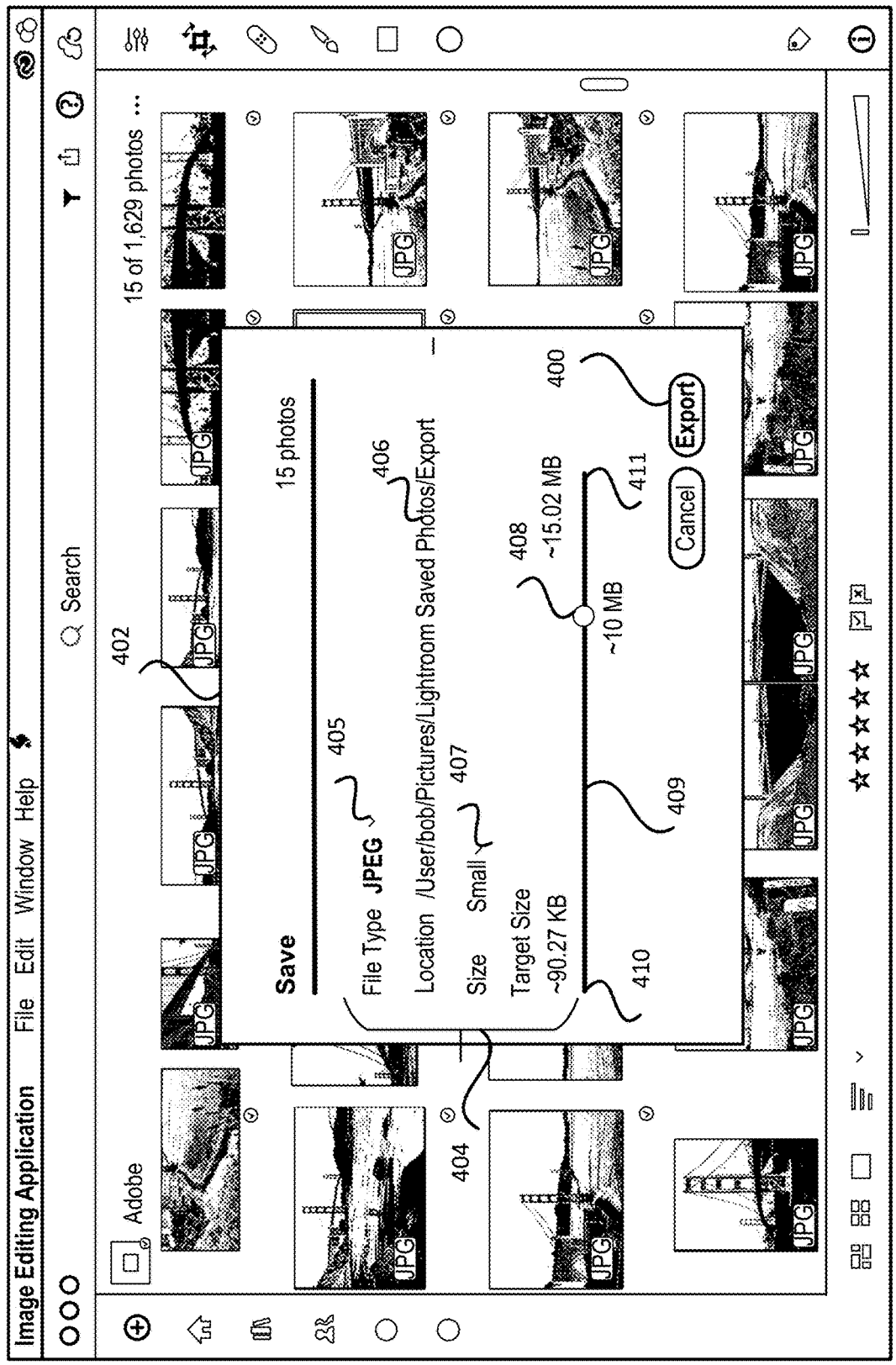
FIG. 4 depicts an example of a user interface used to export a set of images, according to certain embodiments.

Various different techniques may be used to output the range information to the user. In certain embodiments, the GUI 112 may be updated to display the range information along with the other export parameters-related information. FIG. 4 depicts an example of a graphical user interface (GUI) 402 used to export a set of images including showing range information to the user, according to certain embodiments. The GUI 402 may be presented to the user (e.g., user 108 in FIG. 1) by the image editing application 114 as part of the export operation workflow. As shown in FIG. 4, the user has specified export parameter values 404 including an image format (e.g., JPEG in FIG. 4) 405 for the exported images, a destination location 406 for storing the exported images, and an image size dimension 407 (e.g., "small" in FIG. 4) for the exported images. The export parameters 404 illustrated in FIG. 4 are only examples of certain types of export settings or parameters that may be shown via the export dialog UI 402 of the image editing application. In other examples, other export parameters and settings not shown in the UI 402 may also be provided to the user via the UI 402.

In addition to the export parameters 404, GUI 402 also displays range information, where the displayed range information includes information identifying the minimum total export size 410 (90.27 KB) for exporting the selected set of images per parameters 404 and a maximum total export size 411 (16.02 MB). A user-selectable and movable slider 409 is provided that is movable between the minimum total export size and the maximum total export size. The user can adjust the slider to select a particular value for the target total export size, where the user-selected value is in the range from the minimum total export size to the maximum total export size, both end points inclusive. In the illustrated example in FIG. 4, the user has selected a particular total export size of 408 (10 MB) that is between the lower limit minimum total export size and the upper limit maximum total export size.

Referring back to FIG. 2, at 208, the target total export size value selected/input by the user is received. In certain embodiments, the target total export size information may be received by or forwarded to the image quality predictor subsystem 116 for further processing.

At 210, image quality predictor subsystem 116 is configured to predict an optimal image quality level for exporting the set of images based on the target total export size value received in 204 (or 208). In certain embodiments, the optimal image quality level is determined using the particular trained model and represents a maximized image quality level for exporting the set of images while ensuring that the total output size of the set of exported images is within a threshold value of the target total export size value specified by the user. Additional details related to processing performed for determining the optimal image quality level in 210 are described below in detail with reference to FIG. 3.

Figure 3:
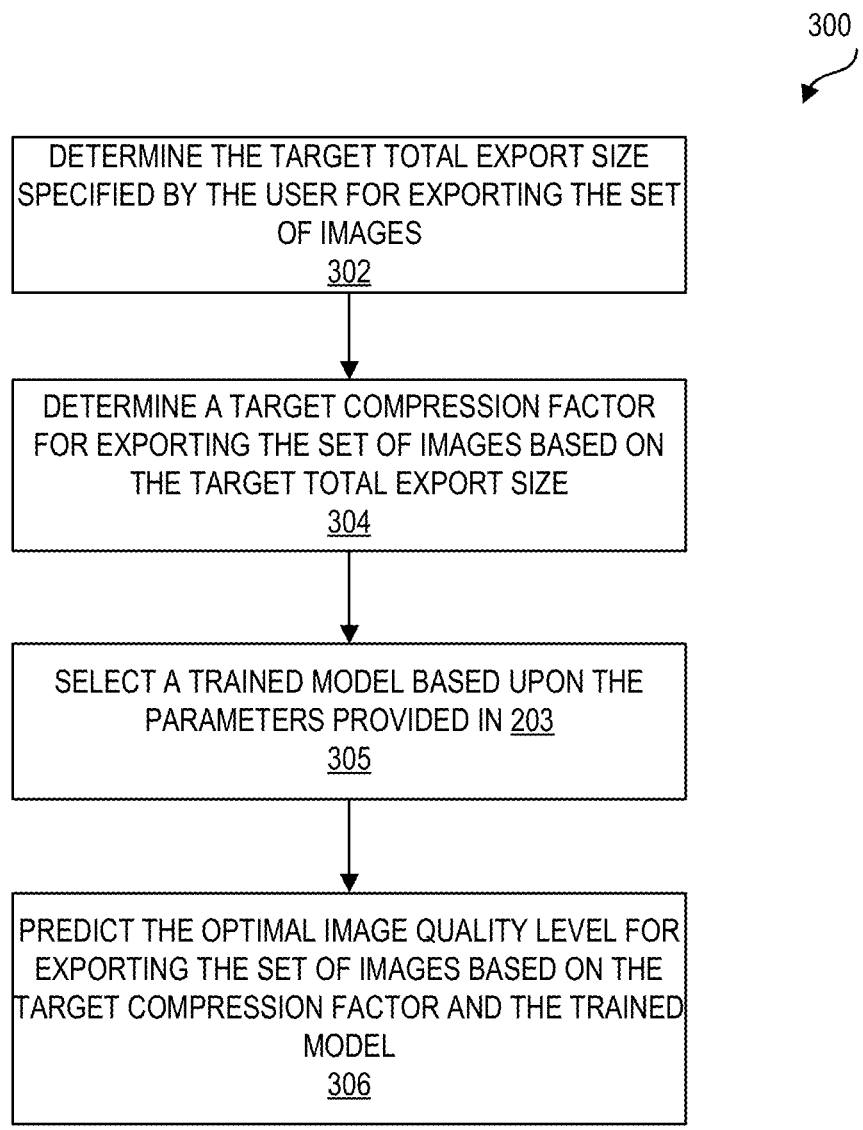
FIG. 3 depicts an example of a process for predicting the optimal image quality level for exporting the set of images, according to certain embodiments.

At 212, the set of images selected in 202 are exported according to the parameters specified in 203 and using the optimal image quality level determined in 210. For example, after selecting the total export size in GUI 402 depicted in FIG. 4, the user may select "Export" button 400 to execute the export operation. The processing in 210 and 212 may be performed upon selecting the "Export" operation. Additional details related to processing performed in 210 is described below with reference to the flowchart depicted in FIG. 3 below FIG. 3 depicts an example of a process 300 for predicting an optimal image quality level for exporting a set of images, according to certain embodiments. The processing depicted in FIG. 3 may be implemented in software (e.g., code, instructions, program) executed by one or more processing units (e.g., processors, cores) of the respective systems, hardware, or combinations thereof. The software may be stored on a non-transitory storage medium (e.g., on a memory device). The process 300 presented in FIG. 3 and described below is intended to be illustrative and non-limiting. Although FIG. 3 depicts the various processing steps occurring in a particular sequence or order, this is not intended to be limiting. In certain alternative embodiments, the steps may be performed in some different order or some steps may also be performed in parallel. In certain embodiments, such as in the embodiment depicted in FIG. 1, the processing depicted in FIG. 3 may be performed by image quality predictor subsystem 116 of image editing application 104.

At 302, the target total export size specified or selected by the user for exporting the set of images is determined. At block 304, a target compression factor is determined for exporting the set of images based upon the target total export size. In one example, the target compression factor is computed as a ratio of the target total export size specified by the user to the maximum total export size (determined in equation 1) obtained by exporting the set of images at 100% image quality level. The target compression factor in 302 is computed as shown in Eq. (3) below:

$$\text{Target Compression Factor} = (\text{target total export size}) / (\text{max total export size}) * 100 \quad \text{Eq. 3:}$$

At 305, a trained model is selected based upon the parameters received as part of 203. As noted above, a particular trained model may be selected based upon the image format to be used for the exported images and the size (e.g., image dimension) for the exported images. For instance, if the parameter values received in 203 indicate that "JPEG" format is the format and a "small" size/dimension is selected for the exported images, the image quality predictor subsystem 116 may choose a particular trained model 128A corresponding to those two parameters.

At 306, the image quality predictor subsystem 116 uses the target compression factor determined in 302 and the particular trained model that has been selected to predict the optimal image quality level for exporting the set of images. In certain examples, as part of the processing in 306, using the selected trained model, an optimal image quality level is determined that correlates to the target compression factor determined in 302.

In certain embodiments, a lookup table that has been previously generated using the selected trained model (e.g., the model represented by Equation 6 identified above) is used to determine a compression factor that is closest to the target compression factor determined in 302 using equation 3. In one embodiment, the lookup table is generated by using different values of "q" (the desired image quality level) as inputs and finding the corresponding output compression factor values using the model. For example, using the model represented by Equation 6, a compression factor value may be determined for values of "q" starting from 0 and all the way to 100 and incrementing by 1 (e.g., for 0, 1, 2, 3, 4, 5, etc.). The lookup table thus contains entries, with each entry containing a mapping between an image quality level and its corresponding compression factor determined using the model represented by Equation 6. Such lookup tables may be precomputed for the different models and stored in a memory location accessible to the image quality predictor subsystem 116 of image editing application 104. For example, as depicted in FIG. 1, these lookup tables 130A-130N may be stored in data storage subsystem 126 accessible to the image editing application 104.

In certain embodiments, the entries in this lookup table are searched to identify a matching entry where the compression factor is same as, or if not the same, is closest to the target compression factor determined in 306. The image quality level identified in the matching entry is then used as the optimal image quality level for the export operation.

Figure 5:
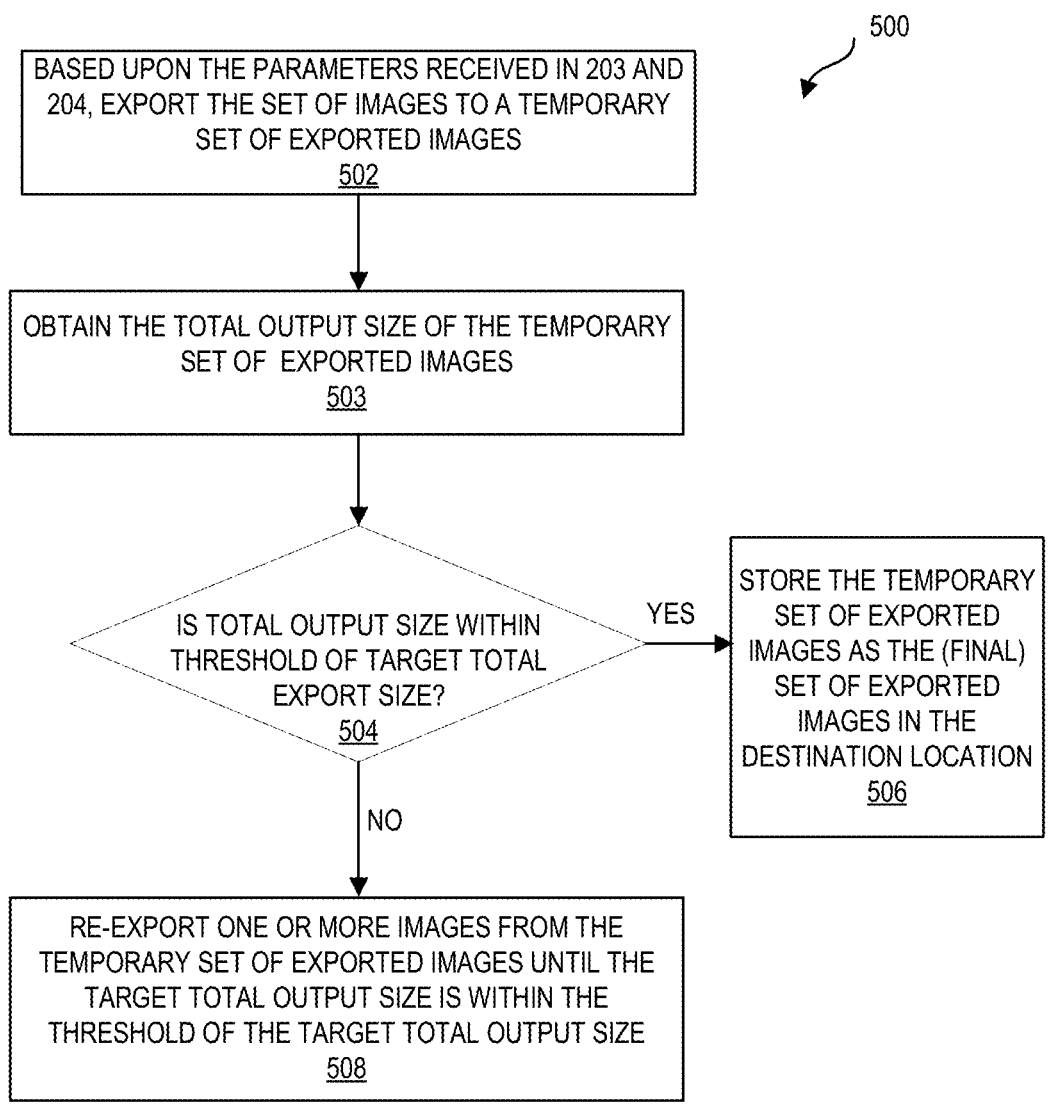
FIG. 5. depicts an example of a process for exporting a set of images, according to certain embodiments.
Figure 6:
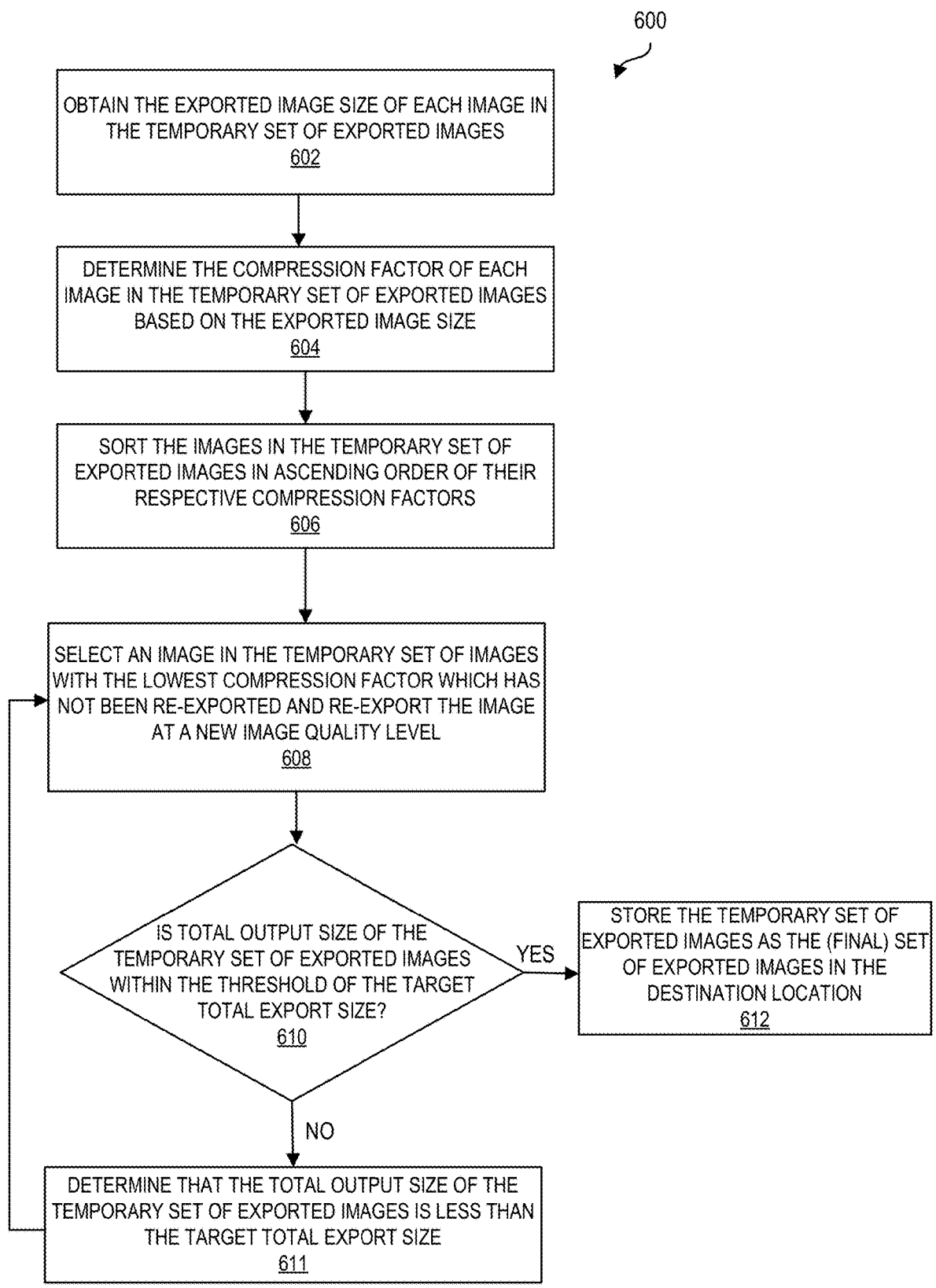
FIG. 6 describes operations performed by the export image generator subsystem to re-export a temporary set of exported images, according to some embodiments.
Figure 7:
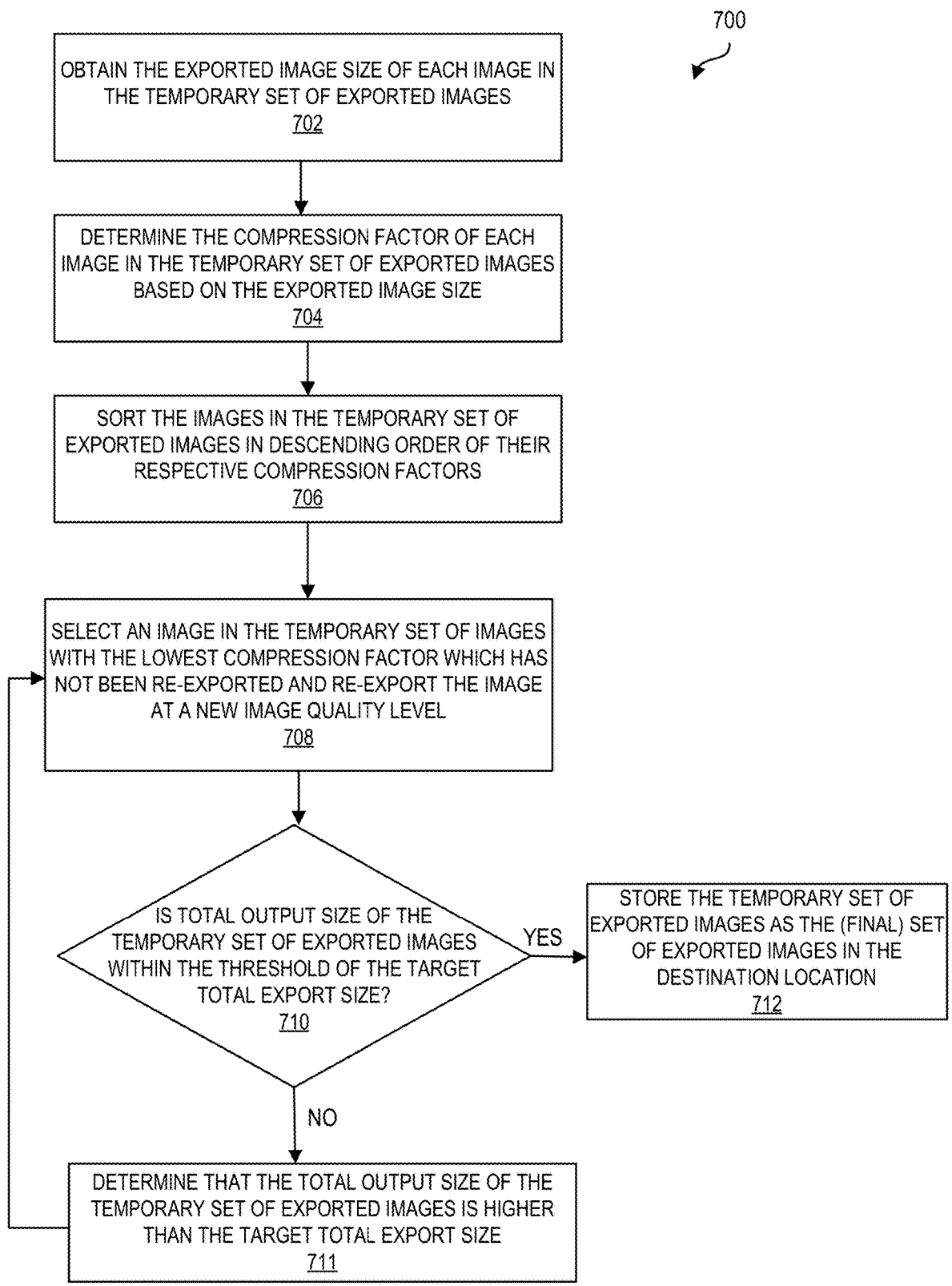
FIG. 7 describes operations performed by the export image generator subsystem to re-export a temporary set of exported images, according to some embodiments.

FIGS. 5-7 depict examples of processes 500-700 for exporting a set of images, according to certain embodiments. The processing depicted in FIGS. 5-7 may be implemented in software (e.g., code, instructions, program) executed by one or more processing units (e.g., processors, cores) of the respective systems, hardware, or combinations thereof. The software may be stored on a non-transitory storage medium (e.g., on a memory device). The processes 500-700 presented in FIGS. 5-7 and described below is intended to be illustrative and non-limiting. Although FIGS. 5-7 depict the various processing steps occurring in a particular sequence or order, this is not intended to be limiting. In certain alternative embodiments, the steps may be performed in some different order or some steps may also be performed in parallel.

In certain embodiments, such as in the embodiment depicted in FIG. 5, the processing depicted in blocks 502-508 in FIG. 5 is performed by the export image generator subsystem depicted in FIG. 1 or other aspects of the image editing application 104 after the user selects the "Export" button 400 (shown in FIG. 4) to execute the export operation (e.g., as a result of executing step 212 in FIG. 2).

At block 502, the process 500 involves exporting the set of images to a temporary set of exported images based on the parameters received in 203 and 204.

At block 503, the process 500 involves obtaining the total output size of the temporary set of exported images. The total output size may be obtained by aggregating the individual exported image sizes of each image exported at the optimal image quality level (e.g., a result of executing step 212 in FIG. 2). In one example, the temporary set of exported images may be stored in a temporary exports data storage location 132 in the data storage subsystem 126 before being exported to the final export storage location 140 specified by the user.

At block 504, the process involves performing a check to determine if the total output size of the temporary set of exported images is within a threshold of the target total export size (for e.g., as selected by the user as part of the process at 204 described in FIG. 2). In one example, the threshold is defined as a certain percentage (e.g., within plus or minus 10%) of the value specified by the user for the target total export size parameter. The threshold value can be specified by a user (e.g., 108) of the image editing application, in some examples, or could be pre-configured by the image editing application as part of the export operation, in other examples.

If it is determined that the total output size of the temporary set of exported images is within the threshold value of the target total export size (for e.g., as selected by the user as part of the process at 204 described in FIG. 2), then, in some examples, the process 500 at block 506 involves storing the temporary set of exported images as the (final) set of exported images in the destination storage location (e.g., 140) specified by the user as part of the export operation (e.g., as part of the export settings in the export dialog UI).

If it is determined that the total output size of the temporary set of exported images is not within (i.e., it is either lower or higher than) the threshold value of the target total export size, at block 508, the process 500 involves re-exporting one or more of the images in the temporary set of exported images until the target total export output size of the temporary set of exported images is within the threshold value. FIG. 6 describes operations performed by the export image generator subsystem 118 to re-export the temporary set of exported images when the total output size of the temporary set of exported images is lower than the threshold value of the target total export size. FIG. 7 describes operations performed by the export image generator subsystem 118 to re-export the temporary set of exported images when the total output size of the temporary set of exported images is higher than the threshold value of the target total export size.

In certain embodiments, such as in the embodiment depicted in FIG. 6, the processing depicted in blocks 602-612 in FIG. 6 is performed by the export image generator subsystem 118 depicted in FIG. 1 or other aspects of the image editing application 104. For instance, the process 600 may be performed by the export image generator subsystem 118 to identify one or more images in the temporary set of exported images to be re-exported when the total output size of the temporary set of exported images is lower than the threshold of the target total export size specified by the user.

At block 602, the process 600 involves obtaining the individual exported image sizes of each image in the temporary set of exported images. In one example, the exported image size of an image refers to the resulting size of the image after the image was exported at the optimal image quality level (e.g., as a result of executing step 212 in FIG. 2).

At block 604, the process 600 involves determining a compression factor of each image in the temporary set of exported images. The compression factor indicates a value (may be represented as a percentage) by which each image in the temporary set of exported images has been "compressed to" after the initial export operation. In one example, the compression factor for an image in the temporary set of exported images may be determined by computing the ratio of the resulting file size of the image after the image was exported at the optimal image quality level to the file size of the image obtained by exporting the image at the maximum possible (i.e., at 100%) image quality level. The compression factor is computed as shown in equation (4) below:

Compression Factor($q$)=(file size of image at $q$% quality)/(File size of image at 100% quality)   Eq. 4:

In may be noted that the compression factor determined for each image in the temporary set of exported images may be different for different images even though all the images in the set of exported images were exported at the same (optimal) image quality. This is because different parts of an image may be compressed differently resulting in different resulting file sizes and different compression factors. As an example, the resulting file size for a first image exported at a particular image quality (q) could be half its file size at 100% image quality resulting in the image being "compressed to" 50% of its original size, whereas the resulting image file size of a second image exported at the same image quality (q) could be one third its file size at 100% image quality resulting in the image being "compressed to" 33% of its original size.

At block 606, the process 600 involves sorting the images in the temporary set of exported images in the ascending order of their respective compression factors.

At block 608, the process 600 involves selecting an image with the lowest compression factor (i.e., the most compressed image at the top of the list) from the temporary set of exported images which has not been re-exported and re-exporting the image at a new image quality level. In one example, the new image quality level for re-exporting the image is determined to be higher than the initial image quality at which the image was exported at. The new image quality level may be higher than the initial image quality if the total output size of the temporary set of exported images is determined to be lower than the threshold value of the target total export size. As noted above, the threshold value is a certain percentage (e.g., that is within plus or minus 10%) of the value specified by the user for the target total export size parameter.

If the total output size of the temporary set of exported images is lower (i.e., minus 10%) than the value of the target total export size specified by the user, then, in some embodiments, at 608, the image is re-exported at 110% of its initial image quality level. Thus, in this case, the new image quality level (at which the image will be re-exported) is higher than the initial image quality level used for the initial export operation. For instance, if the initial image quality level (q) at which the image was initially exported was determined to be 80% (as a result of executing 210) and the total output size of the temporary set of exported images is lower (i.e., minus 10%) of the value of the target total export size, then the new image quality level used to re-export the image is determined to be 110% of 80%=88%.

If the total output size of the temporary set of exported images is determined to be higher (i.e., plus 10%) of the value of the target total export size, then the image is re-exported at 90% of its initial image quality level. Thus, in this case, and as further described in FIG. 7, the new image quality level used for the re-export operation is lower than the initial image quality level used for the initial export operation.

At block 610, the process 600 involves performing a check to determine if the total output size of the temporary set of exported images is within the threshold value of the target total export size. If the total output size of the temporary set of exported images is not within the threshold value of the target total export size, then at block 611, the process 600 involves determining that the total output size of the temporary set of exported images is less than the target total output size. If this condition is satisfied, the process 600 then loops back to block 608 to select the next image (e.g., the image with the next lowest compression factor) from the set of exported images which has not been re-exported and re-exports the image at the new image quality level. Upon re-exporting the image at the new image quality level, the re-exported image replaces the previously exported image in the temporary set of exported images.

If at block 610 it is determined that the total output size of the temporary set of exported images is within the threshold of the target total export size, then, in some examples, the process 600 at block 612 involves storing the temporary set of exported images as the (final) set of exported images in the destination folder (e.g., 140) specified by the user as part of the export operation (e.g., as part of the export settings in the export dialog UI).

FIG. 7 describes operations performed by the export image generator subsystem to re-export the temporary set of exported images when the total output size of the temporary set of exported images is higher than the threshold value of the target total export size, according to certain embodiments. In certain embodiments, such as in the embodiment depicted in FIG. 7, the processing depicted in blocks 702-712 in FIG. 7 is performed by the export image generator subsystem 118 depicted in FIG. 1 or other aspects of the image editing application 104.

At block 702, the process 700 involves obtaining the individual exported image sizes of each image in the temporary set of exported images. In one example, the exported image size of an image refers to the resulting size of the image after the image was exported at the optimal image quality level (e.g., e.g., as a result of executing step 212 in FIG. 2).

At block 704, the process 700 involves determining a compression factor of each image in the temporary set of exported images. As discussed above in relation to FIG. 6, the compression factor indicates a value (may be represented as a percentage) by which each image in the temporary set of exported images has been "compressed to" after the initial export operation. In one example, the compression factor is computed as shown in equation (4) and reproduced below:

Compression Factor($q$)=(file size of image at $q$% quality)/(File size of image at 100% quality)   Eq. 4:

At block 706, the process 700 involves sorting the images in descending order of their respective compression factors.

At block 708, the process 700 involves selecting an image with the highest compression factor (i.e., the least compressed image at the top of the list) from the temporary set of exported images which has not been re-exported which has not been re-exported and re-exporting the image at a new image quality level. If the total output size of the temporary set of exported images is higher (i.e., plus 10%) of the value of the target total export size, then, in some embodiments, at 708, the new image quality level (at which the image will be re-exported) is lower than the initial image quality level used for the initial export operation. For instance, if the initial image quality level (q) at which the image was initially exported was determined to be 80% (as a result of executing step 210) and the total output size of the temporary set of exported images is higher (i.e., plus 10%) of the value of the target total export size, then the new image quality level used to re-export the image is determined to be 90% of 80%=72%.

At block 710, the process 700 involves performing a check to determine if the total output size of the temporary set of exported images is within the threshold of the target total export size. If the total output size of the temporary set of exported images is not within the threshold of the target total export size, then at block 711, the process 700 involves determining that the total output size of the temporary set of exported images is higher than the target total output size. If this condition is satisfied, the process 700 then loops back to block 708 to select the next image (e.g., the image with the next highest compression factor) from the set of exported images which has not been re-exported and re-exports the image at the new image quality level. Upon re-exporting the image at the new image quality level, the re-exported image replaces the previously exported image in the temporary set of exported images.

If at block 710 it is determined that the total output size of the temporary set of exported images is within the threshold of the target total export size, then, in some examples, the process 700 at block 712 involves storing the temporary set of exported images as the (final) set of exported images in the destination folder (e.g., 140) specified by the user as part of the export operation (e.g., as part of the export settings in the export dialog UI).

In certain embodiments, the computing environment 100 includes one or more training models 128A-128N stored in a data storage subsystem 126 accessible to the computer system 102. In certain examples, the data storage system 126 may be an internal or external storage location utilized by the computer system 102 to store information pertaining to training models 128A-128N. In certain examples, the data storage system 126 may store one or more look-up tables 130A-130N generated by the training models 128A-128N and a set of exported images 132 generated as a result of an export operation performed by the image export subsystem 118. In certain examples, the image editing application 104 may utilize the information generated by the training models 128A-128N to predict an optimal image quality level for exporting the set of images such that the total output size of the set of exported images (i.e., the total memory needed for the set of exported images) is within a threshold value of the target total export size specified by the user. In other examples, the image editing application 104 may utilize the information generated by the training models 128A-128N to determine the minimum total export size of the set of images (e.g., computed in equation 2).

In some examples, each training model 128A-128N may be trained using different training datasets 137 stored in a training subsystem 134 accessible to the data storage subsystem 126. Each training dataset may comprise images of a particular image format and a particular image size dimension. For instance, a first training model 128A may be trained using a training dataset comprising "JPEG" images of a "small" dimension, a second training model 128B may be trained using a training dataset comprising "JPEG" images of a "medium" dimension, a third training model 128C may be trained using a training dataset comprising "JPEG" images of a "large" dimension and so on. In a similar manner, the models 128A-128N may be may be trained using training datasets comprising images of other image formats (e.g., GIF, TIFF etc.) and of different image size dimensions. The discussion below relates to training and implementing a training model 128A using a training dataset comprising "JPEG" images of a "small" dimension.

However, it is to be appreciated that the discussion below can be applied to other training models trained using training datasets of different configurations of image formats and image size dimensions, in other examples.

Figure 8:
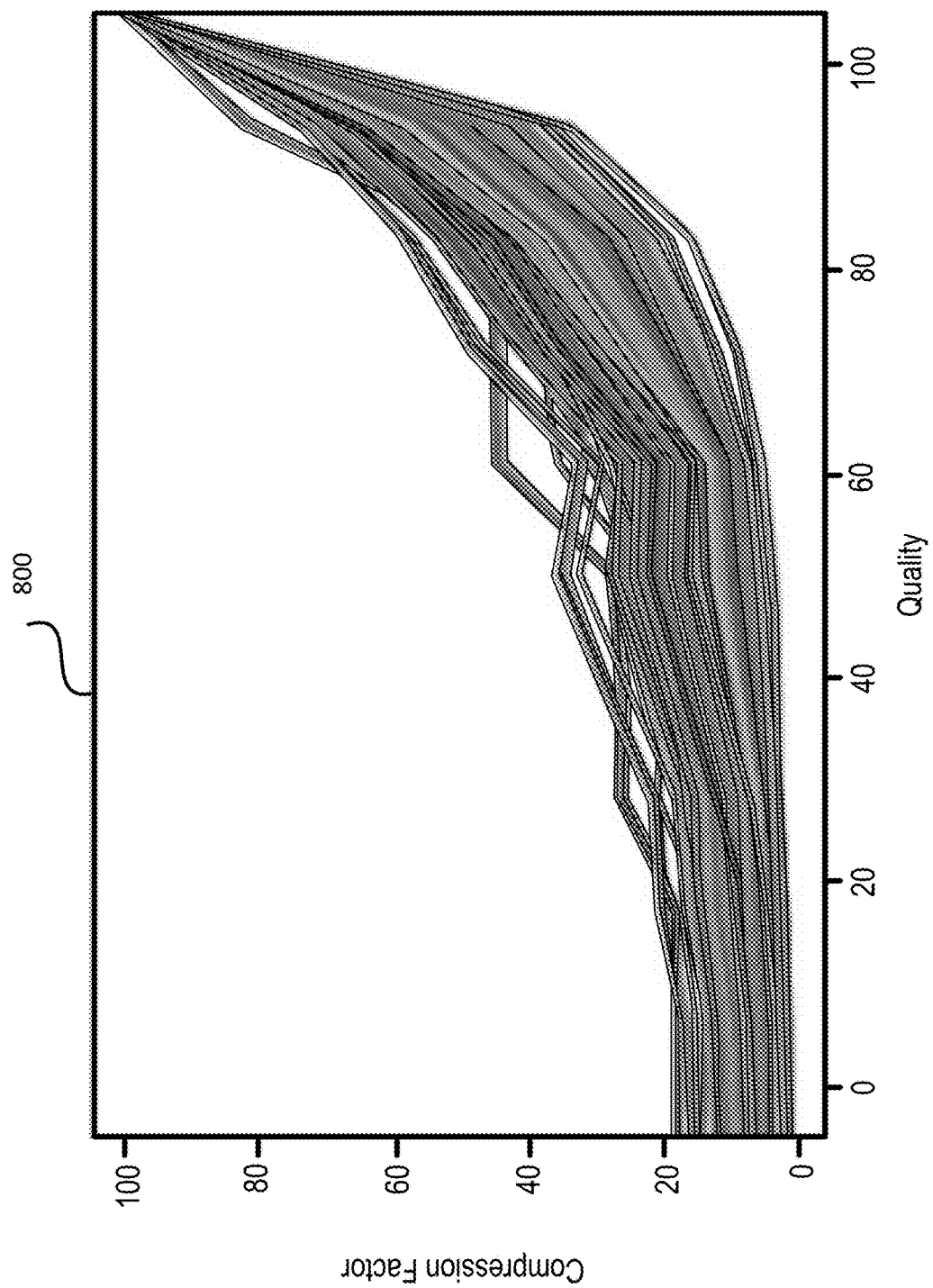
FIG. 8 is a graph illustrating the relationship between image quality levels and image compression factors for a set of exported images, according to certain embodiments.
Figure 9:
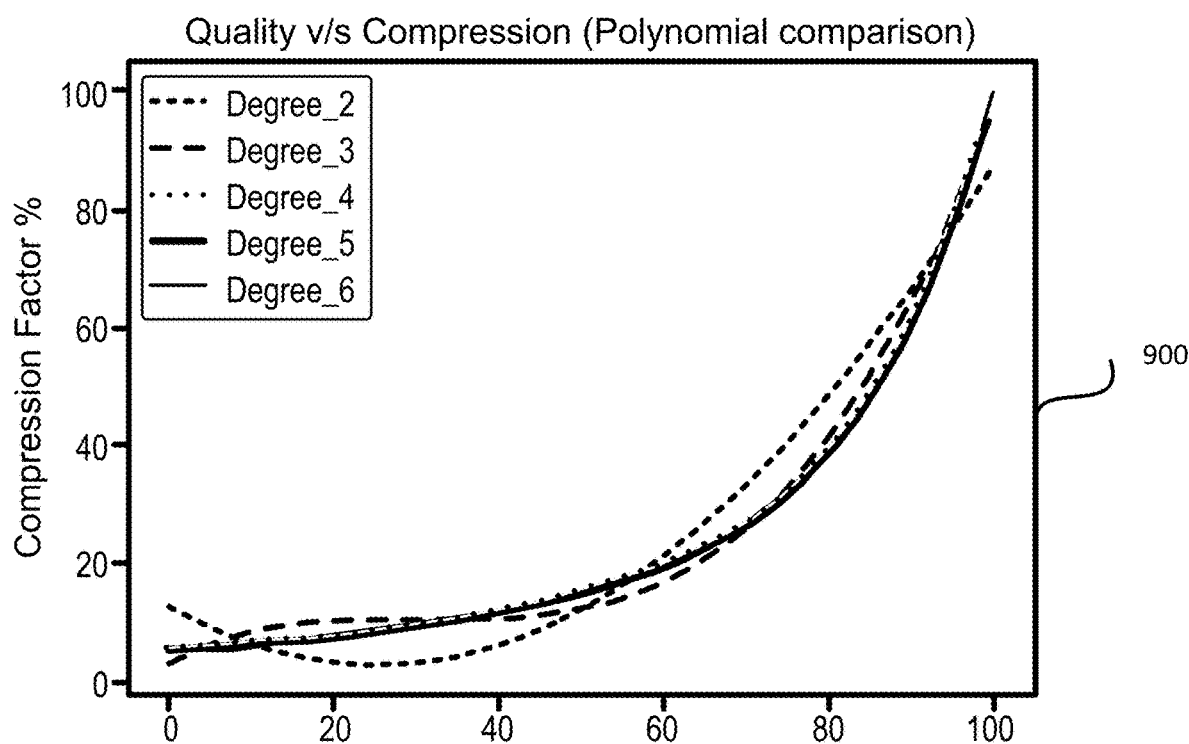
FIG. 9 is a graphical representation of compression factors predicted by different polynomial regression models given a set of image quality values, according to certain embodiments.

In a certain implementation, a random set of images of a "JPEG" image format and a "small" image file dimension were obtained and exported at different image quality levels (0-100) to generate a training dataset 137 for training a training model 128A. A compression factor at each image quality level (q) with respect to a maximum image quality level (q=100) was computed for each image in the set of images as shown in equation (5) below:

compression factor($q$)=(File size of image at $q$% quality)/(File size of image at 100% quality)*100    Equation (5):

A graph of experimental results was obtained by plotting a graph of the image quality level and image compression factor for each image in the set of images obtained from the training dataset. FIG. 8 is a graph illustrating the relationship between image quality levels and corresponding image compression factors for a set of exported images, according to certain embodiments. The graph 800 indicates that the relationship between the image quality level and the compression factors does not follow a linear relationship. In one implementation, a set of polynomial regression models were trained to fit a polynomial regression equation (representing a polynomial regression model) to the data (i.e., the set of images) and to predict/infer a value (e.g., a compression factor) from a finite set of input values (e.g., image quality values). The degree for the image quality level was varied from the second order polynomial to the sixth order polynomial in each model. FIG. 9 is a graphical representation 900 of compression factors predicted by the different polynomial regression models, in certain embodiments. The Root Mean Square Error (RMSE) and R2 score (statistical measures of how close the data are to the fitted regression line) generated by each model is illustrated in table-1 shown below:

| Degree | RMSE | R2_Score |
| --- | --- | --- |
| Degree 2 | 7.57732 | 0.927130 |
| Degree 3 | 4.432717 | 0.975062 |
| Degree 4 | 3.738740 | 0.982259 |
| Degree 5 | 3.681797 | 0.982795 |
| Degree 6 | 3.650153 | 0.983090 |

Based on the results, a polynomial regression model with degree 4 was selected as the model which resulted in the best fit to the data (i.e., the set of images) without resulting in over-fitting the data. The model equation for calculating the image compression factor for a given image quality determined by the coefficients of the pre-trained model (i.e., the polynomial regression model with degree 4) is shown in Equation (6) below:

$cf(q) = 6.01 - 0.249q + 2.48*10^{-2}q^2 - 5.19*10^{-4}q^3 + 3.892*10^{-6}q^4$    Equation (6):

where, "q" is the desired image quality level and cf(q) is the compression factor output by the model for a particular quality level "q." The equation (model) was then used to determine compression factors for different image quality values (e.g., ranging from 0-100). In one example, a lookup table (e.g., 130A) containing entries, with each entry containing a mapping between an image quality level and its corresponding compression factor was generated using the model represented by Equation 6. In other examples, additional lookup tables (e.g., 130B-130N) may be precomputed using the different models (128A-128N) and stored in a memory location accessible to the image quality predictor subsystem 116 of image editing application 104. As noted above, in certain examples, the entries in the lookup table are searched (for e.g., by performing a binary search) to identify a matching entry where the compression factor is same as, or if not the same, is closest to the target compression factor (e.g., determined in block 306 of FIG. 3). The image quality level identified in the matching entry is then used as the optimal image quality level for the export operation. In certain examples, and as noted above, the range estimator subsystem 114 may utilize the information in the lookup table of values generated from the trained model to determine the minimum total export size for storing the set of exported images (e.g., computed in equation 2).

The present disclosure addresses several deficiencies of conventional export systems by providing an intelligent and improved export functionality for exporting a set of images. As described above, by providing a new target total export size parameter, the image editing application enables a user to have control over the total memory size used for storing the exported images. Additionally, the user does not have to specify or worry about the image quality to be used for exporting the set of images. The image editing application automatically determines an optimized image quality to be used for the export operation while considering the user specified value for the target total export size parameter. The optimized image quality level is determined using trained models and represents a maximized image quality level for exporting the set of images while ensuring that the total output size of the set of exported images is within a threshold value of the target total export size value specified by the user. The image export system then exports the images using the predicted image quality while ensuring that the total memory size required to store the exported images is close to the target total export size value specified by the user.

Figure 10:
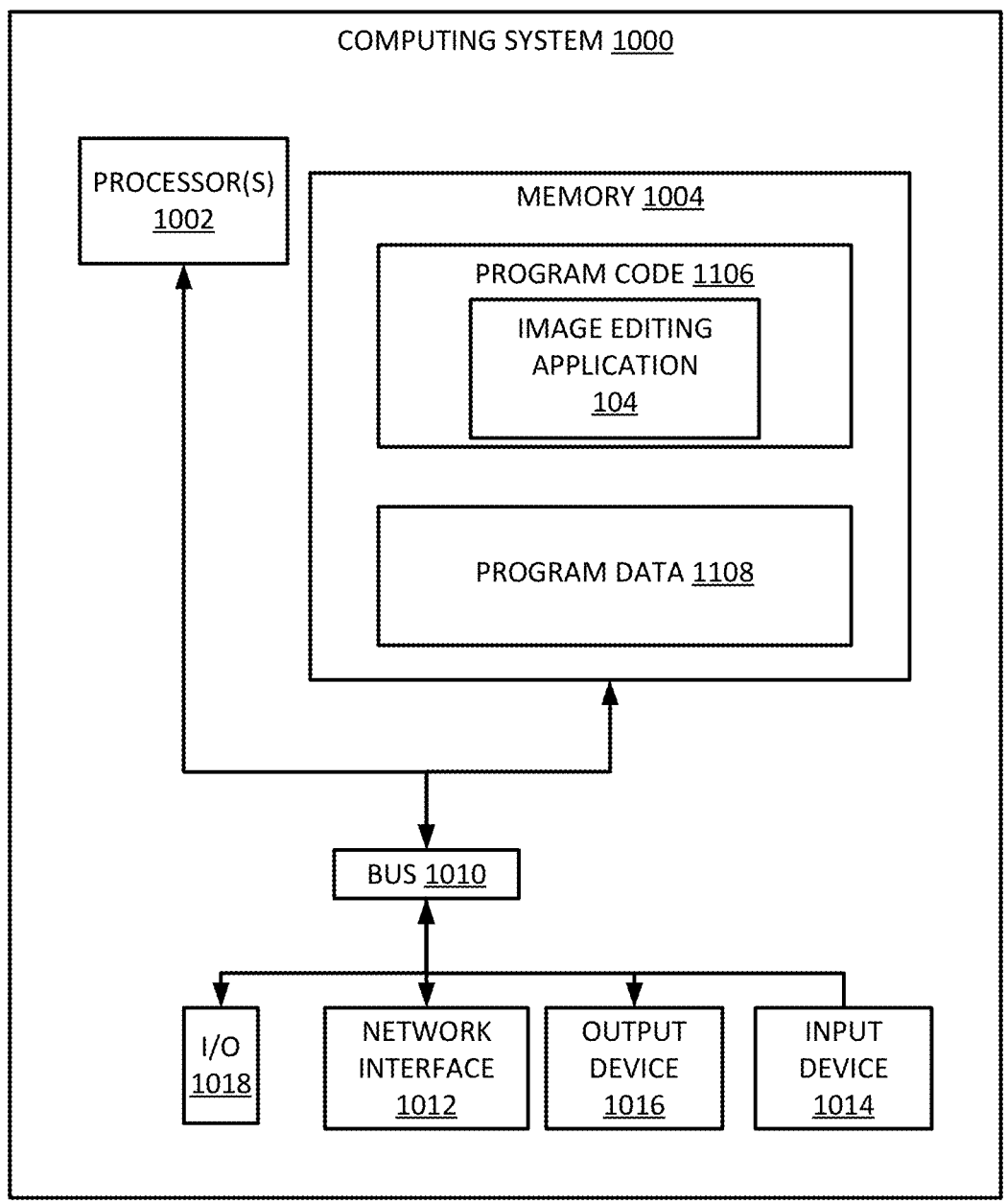
FIG. 10 depicts an example of a computing system for implementing certain embodiments of the present disclosure.

Any suitable computing system or group of computing systems can be used for performing the operations described herein. For example, FIG. 10 depicts an example of a computing system 1000. The computing system 1000 implements the image editing application 104. In an embodiment, a computing system 1000 having devices similar to those depicted in FIG. 10 (e.g., a processor, a memory, etc.) combines the one or more operations and data stores that may be operated as separate subsystems.

The depicted example of the computing system 1000 includes a processor 1002 communicatively coupled to one or more memory devices 1004. The processor 1002 executes computer-executable program code stored in a memory device 1004, accesses information stored in the memory device 1004, or both. Examples of the processor 1002 include a microprocessor, an application-specific integrated circuit ("ASIC"), a field-programmable gate array ("FPGA"), or any other suitable processing device. The processor 1002 can include any number of processing devices, including a single processing device.

The memory device 1004 includes any suitable non-transitory computer-readable medium for storing program code 1006, program data 1008, or both. A computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C#, Visual Basic, Java, Python, Perl, JavaScript, and ActionScript. In various examples, the memory device 1004 can be volatile memory, non-volatile memory, or a combination thereof.

The computing system 1000 executes program code 1006 that configures the processor 1002 to perform one or more of the operations described herein. Examples of the program code 1006 include, in various embodiments, the image editing application 104, which may include the image export system 136, or any other suitable systems or subsystems that perform one or more operations described herein (e.g., one or more development systems for configuring an interactive user interface). The program code 1006 may be resident in the memory device 1004 or any suitable computer-readable medium and may be executed by the processor 1002 or any other suitable processor.

The processor 1002 is an integrated circuit device that can execute the program code 1006. The program code 1006 can be for executing an operating system, an application system or subsystem (e.g., the image editing application 104 or image export system 136), or both. When executed by the processor 1002, the instructions cause the processor 1002 to perform operations of the program code 1006. When being executed by the processor 1002, the instructions are stored in a system memory, possibly along with data being operated on by the instructions. The system memory can be a volatile memory storage type, such as a Random Access Memory (RAM) type. The system memory is sometimes referred to as Dynamic RAM (DRAM) though need not be implemented using a DRAM-based technology. Additionally, the system memory can be implemented using non-volatile memory types, such as flash memory.

In some embodiments, one or more memory devices 1004 store the program data 1008 that includes one or more datasets and models described herein. Examples of these datasets include document data, layout change information, text data, etc. In some embodiments, one or more of data sets, models, and functions are stored in the same memory device (e.g., one of the memory devices 1004). In additional or alternative embodiments, one or more of the programs, data sets, models, and functions described herein are stored in different memory devices 1004 accessible via a data network. One or more buses 1010 are also included in the computing system 1000. The buses 1010 communicatively couple one or more components of a respective one of the computing system 1000.

In some embodiments, the computing system 1000 also includes a network interface device 1012. The network interface device 1012 includes any device or group of devices suitable for establishing a wired or wireless data connection to one or more data networks. Non-limiting examples of the network interface device 1012 include an Ethernet network adapter, a modem, and/or the like. The computing system 1000 is able to communicate with one or more other computing devices via a data network using the network interface device 1012.

The computing system 1000 may also include a number of external or internal devices, an input device 1014, a presentation device 1016, or other input or output devices. For example, the computing system 1000 is shown with one or more input/output ("I/O") interfaces 1018. An I/O interface 1018 can receive input from input devices or provide output to output devices. An input device 1014 can include any device or group of devices suitable for receiving visual, auditory, or other suitable input that controls or affects the operations of the processor 1002. Non-limiting examples of the input device 1014 include a touchscreen, a mouse, a keyboard, a microphone, a separate mobile computing device, etc. A presentation device 1016 can include any device or group of devices suitable for providing visual, auditory, or other suitable sensory output. Non-limiting examples of the presentation device 1016 include a touchscreen, a monitor, a speaker, a separate mobile computing device, etc.

Although FIG. 10 depicts the input device 1014 and the presentation device 1016 as being local to the computing device that executes the document editor 102, other implementations are possible. For instance, in some embodiments, one or more of the input device 1014 and the presentation device 1016 can include a remote client-computing device that communicates with the document editor 102 via the network interface device 1012 using one or more data networks described herein.

Figure 11:
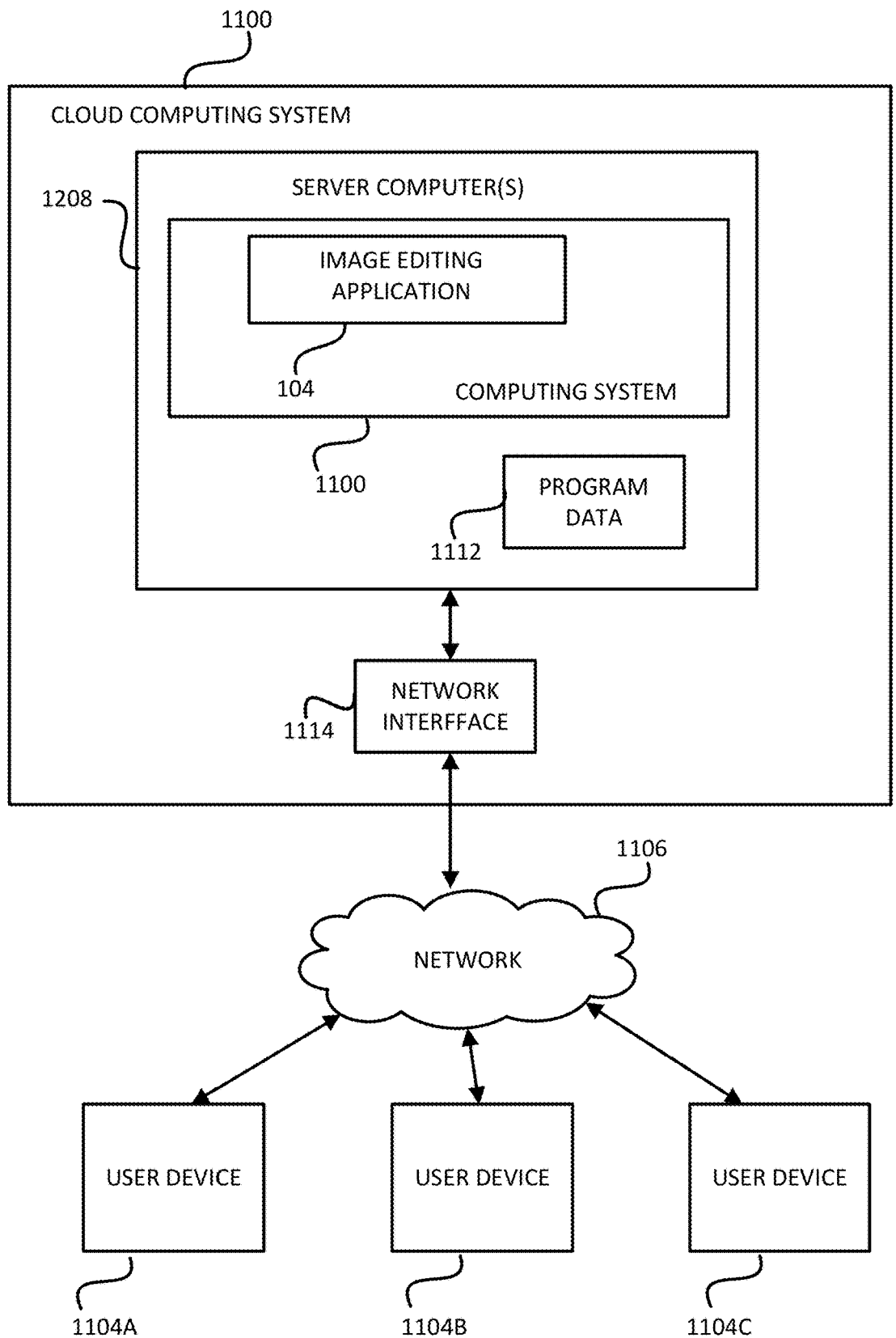
FIG. 11 depicts an example of a cloud computing system offering an image exporting service, in accordance with certain embodiments.

In some embodiments, the functionality provided by the image editing application 104 (including the image export system 136) may be offered as cloud services by a cloud service provider. For example, FIG. 11 depicts an example of a cloud computing system 1100 offering an image editing and exporting service that can be used by a number of user subscribers using user devices 1104a, 1104b, and 1104c across a data network 1106. In the example, the image editing and exporting service may be offered under a Software as a Service (SaaS) model. One or more users may subscribe to the image editing and exporting service, and the cloud computing system 1100 performs the processing to provide the image editing and exporting service to subscribers. The cloud computing system 1100 may include one or more remote server computers 1108.

The remote server computers 1108 include any suitable non-transitory computer-readable medium for storing program code 1110 (e.g., the document editor 102) and program data 1112, or both, which is used by the cloud computing system 1100 for providing the cloud services. A computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++,C#, Visual Basic, Java, Python, Perl, JavaScript, and ActionScript. In various examples, the server computers 1108 can include volatile memory, non-volatile memory, or a combination thereof.

One or more of the servers 1108 execute the program code 1110 that configures one or more processors of the server computers 1108 to perform one or more of the operations that provide document editing services, including the ability to generate documents with resized text based upon layout changes of one or more original documents provided by one or more subscribers. As depicted in the embodiment in FIG. 11, the one or more servers providing the services to export images implement the image editing application 104 including the image export subsystem 136. Any other suitable systems or subsystems that perform one or more operations described herein (e.g., one or more development systems for configuring an interactive user interface) can also be implemented by the cloud computing system 1100.

In certain embodiments, the cloud computing system 1100 may implement the services by executing program code and/or using program data 1112, which may be resident in a memory device of the server computers 1108 or any suitable computer-readable medium and may be executed by the processors of the server computers 1108 or any other suitable processor.

In some embodiments, the program data 1112 includes one or more datasets and models described herein. Examples of these datasets include training datasets, precomputed values of maximum image file sizes, look-up tables generated by training models comprising image compression factors and corresponding image quality values and so on. In some embodiments, one or more of data sets, models, and functions are stored in the same memory device. In additional or alternative embodiments, one or more of the programs, data sets, models, and functions described herein are stored in different memory devices accessible via the data network 1106.

The cloud computing system 1100 also includes a network interface device 1114 that enable communications to and from cloud computing system 1100. In certain embodiments, the network interface device 1114 includes any device or group of devices suitable for establishing a wired or wireless data connection to the data networks 1106. Non-limiting examples of the network interface device 1114 include an Ethernet network adapter, a modem, and/or the like. The document editor 1102 is able to communicate with the user devices 1104a, 1104b, and 1104c via the data network 1106 using the network interface device 1114.

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alternatives to, variations of, and equivalents to such embodiments. Accordingly, it should be understood that the present disclosure has been presented for purposes of example rather than limitation, and does not preclude the inclusion of such modifications, variations, and/or additions to the present subject matter as would be readily apparent to one of ordinary skill in the art.

What is claimed is:

1. A method comprising:
   receiving, by one or more processors, information identifying a set of one or more image files to be exported;
   receiving, by the one or more processors, a set of one or more parameter values to be used for exporting the set of one or more image files;
   receiving, by the one or more processors, a target total export size value for exporting the set of image files, the target total export size value indicative of a memory size for storing a set of exported image files to be generated by exporting the set of image files;
   determining, by the one or more processors, based upon the target total export size value and the set of one or more parameter values, an image quality level to be used for exporting the set of image files; and
   generating, by the one or more processors, the set of exported image files based on the set of image files, the generating comprising exporting each image file in the set of image files to generate a corresponding exported image file in the set of exported image files, wherein the set of exported image files is generated using the image quality level and based upon the set of one or more parameter values such that a total memory size for storing the set of exported image files is within a threshold value of the target total export size value.

2. The method of claim 1, further comprising:
   determining, by the one or more processors, a maximum total export size and a minimum total export size for storing the set of exported image files, wherein the maximum total export size represents an upper limit for the memory size for storing the set of exported image files and the minimum total export size represents a lower limit of the memory size for storing the set of exported image files.

3. The method of claim 2, wherein determining, by the one or more processors, the maximum total export size for storing the set of exported image files further comprises:
   obtaining, by the one or more processors, individual file sizes of each exported image file in the set of exported image files; and
   aggregating, by the one or more processors, the individual file sizes of each exported image file to determine the maximum total export size for exporting the set of image files.

4. The method of claim 3, wherein the individual file sizes of each exported image file in the set of exported image files are precomputed by the one or more processors by exporting each image file in the set of image files at a maximum image quality level.

5. The method of claim 3, wherein determining, by the one or more processors, the maximum total export size for storing the set of exported image files further comprises:
   identifying, by the one or more processors, one or more edits applied to the image files in the set of image files;
   exporting, by the one or more processors, each image file in the set of image files with the one or more edits at a maximum image quality level;
   obtaining, by the one or more processors, a resulting file size for each exported image file in the set of exported image files as a result of the exporting; and
   aggregating, by the one or more processors, the resulting file sizes to determine the maximum total export size for exporting the set of image files.

6. The method of claim 2, wherein determining, by the one or more processors, the minimum total export size for exporting the set of image files comprises:
   selecting, by the one or more processors, a trained model from a set of trained models based on the set of one or more parameter values; and
   utilizing, by the one or more processors, the selected trained model and the maximum total export size for storing the set of exported image files to determine the minimum total export size for exporting the set of image files, wherein the selected trained model correlates one or more image quality levels to one or more corresponding image compression factors.

7. The method of claim 1, further comprising, outputting, by the, a maximum total export size for storing the set of exported image files and a minimum total export size for storing the set of exported image files, wherein the target total export size value is within a range from the minimum total export size to the maximum total export size.

8. The method of claim 1, wherein determining, by the one or more processors, the image quality level for exporting the set of image files comprises:
   determining a target image compression factor for exporting the set of image files based on the target total export size value;
   selecting a trained model from a plurality of trained models based upon the set of one or more parameter values; and
   predicting the image quality level for exporting the set of image files based on the target image compression factor and the selected trained model.

9. The method of claim 8, wherein the predicting further comprises:
   determining a compression factor that is closest to the target image compression factor using a lookup table of values generated using the trained model, wherein the lookup table of values correlates one or more image quality levels to one or more corresponding image compression factors; and
   determining the image quality level that correlates to the compression factor that is closest to the target image compression factor using the lookup table of values.

10. The method of claim 1, wherein exporting the set of image files at the image quality level comprises:

obtaining a total output size of the set of exported image files;

determining that the total output size of the set of exported image files is within the threshold value of the target total export size value; and based on the determining that the total output size of the set of exported image files is within the threshold value of the target total export size value, storing the set of exported image files in a destination location specified as part of the set of one or more parameter values specified for exporting the set of one or more image files.

11. The method of claim 1, wherein exporting the set of image files at the image quality level comprises:

exporting, by the one or more processors, the set of image files to a temporary set of exported image files;

obtaining, by the one or more processors, a total output size of the temporary set of exported image files;

determining, by the one or more processors, that the total output size of the temporary set of exported image files is not within the threshold value of the target total export size value; and based on the determining that the total output size of the temporary set of exported image files is not within the threshold value of the target total export size value, re-exporting one or more of the image files in the temporary set of exported image files until the total output size of the temporary set of exported image files is within the threshold value of the target total export size value.

12. The method of claim 11, wherein the re-exporting further comprises:

obtaining an exported image file size of each image file in the temporary set of exported image files;

determining image compression factors of each image file in the temporary set of exported image files based on the exported image file size;

selecting an image file in the temporary set of exported image files with a lowest image compression factor;

determining a new image quality level for re-exporting the selected image file, wherein the new image quality level is lower than the image quality level used for exporting the set of image files; and re-exporting the image file at the new image quality level.

13. The method of claim 11, wherein the re-exporting further comprises:

obtaining an exported image file size of each image file in the temporary set of exported image files;

determining image compression factors of each image file in the temporary set of exported image files based on the exported image file size;

selecting an image file in the temporary set of exported image files with a highest image compression factor;

determining a new image quality level for re-exporting the selected image file, wherein the new image quality level is higher than the image quality level used for exporting the set of image files; and re-exporting the image file at the new image quality level.

14. A system comprising:

a memory storing a set of one or more image files to be exported; and one or more processors configured to perform processing comprising:

receiving information identifying the set of one or more image files to be exported;

receiving a set of one or more parameter values to be used for exporting the set of one or more image files;

receiving a target total export size value for exporting the set of image files, the target total export size value indicative of a memory size for storing a set of exported image files to be generated by exporting the set of image files;

determining, based upon the target total export size value and the set of one or more parameter values, an image quality level to be used for exporting the set of image files; and generating the set of exported image files based on the set of image files, the generating comprising exporting each image file in the set of image files to generate a corresponding exported image file in the set of exported image files, wherein the set of exported image files is generated using the image quality level and based upon the set of one or more parameter values such that a total memory size for storing the set of exported image files is within a threshold value of the target total export size value.

15. The system of claim 14, wherein the processing further comprises:

determining a maximum total export size and a minimum total export size for storing the set of exported image files, wherein the maximum total export size represents an upper limit for the memory size for storing the set of exported image files and the minimum total export size represents a lower limit of the memory size for storing the set of exported image files.

16. The system of claim 15, wherein the processing further comprises outputting the maximum total export size and the minimum total export size, wherein the target total export size value is selected within a range from the minimum total export size to the maximum total export size.

17. The system of claim 14, wherein the processing for exporting the set of image files at the image quality level comprises:

exporting the set of image files to a temporary set of exported image files;

obtaining a total output size of the temporary set of exported image files;

determining that the total output size of the temporary set of exported image files is not within the threshold value of the target total export size value; and based on the determining that the total output size of the temporary set of exported image files is not within the threshold value of the target total export size value, re-exporting one or more of the image files in the temporary set of exported image files until the total output size of the temporary set of exported image files is within the threshold value of the target total export size value.

18. A non-transitory computer-readable medium having program code that is stored thereon, the program code executable by one or more processing devices for performing operations comprising:

receiving information identifying a set of one or more image files to be exported;

receiving a set of one or more parameter values to be used for exporting the set of one or more image files;

receiving a target total export size value for exporting the set of image files, the target total export size value indicative of a memory size for storing a set of exported image files to be generated by exporting the set of image files;

determining based upon the target total export size value and the set of one or more parameter values, an image quality level to be used for exporting the set of image files; and generating the set of exported image files based on the set of image files, the generating comprising exporting each image file in the set of image files to generate a corresponding exported image file in the set of exported image files, wherein the set of exported image files is generated using the image quality level and based upon the set of one or more parameter values such that a total memory size for storing the set of exported image files is within a threshold value of the target total export size value.

19. The non-transitory computer-readable medium of claim 18, wherein the operations further comprise:

determining a maximum total export size and a minimum total export size for storing the set of exported image files, wherein the maximum total export size represents an upper limit for the memory size for storing the set of exported image files and the minimum total export size represents a lower limit of the memory size for storing the set of exported image files.

20. The non-transitory computer-readable medium of claim 19, wherein the operations for determining the maximum total export size for storing the set of exported image files further comprise:

obtaining individual file sizes corresponding to each exported image file in the set of exported image files; and aggregating the individual file sizes of each exported image file to determine the maximum total export size for exporting the set of image files.

* * * * *